(12) United States Patent
Zanella et al.

(10) Patent No.: US 8,375,743 B2
(45) Date of Patent: Feb. 19, 2013

(54) AUTOMATIC GREASING OF MOLDS FOR FORMING HOLLOW GLASS PRODUCTS

(75) Inventors: Evelino Zanella, Carcare (IT); Samuele Ghione, Acqui Terme (IT)

(73) Assignee: Saint-Gobain Emballage, Courbevoie (FR)

( * ) Notice: Subject to any disclaimer, the term of this patent is extended or adjusted under 35 U.S.C. 154(b) by 359 days.

(21) Appl. No.: 12/302,294

(22) PCT Filed: May 29, 2007

(86) PCT No.: PCT/FR2007/051343
§ 371 (c)(1),
(2), (4) Date: Nov. 25, 2008

(87) PCT Pub. No.: WO2007/138226
PCT Pub. Date: Dec. 6, 2007

(65) Prior Publication Data
US 2009/0173105 A1  Jul. 9, 2009

(30) Foreign Application Priority Data
May 29, 2006 (FR) .................................... 06 51928

(51) Int. Cl.
*C03B 40/027* (2006.01)
(52) U.S. Cl. .......................................................... 65/26
(58) Field of Classification Search ............... 65/26, 169
See application file for complete search history.

(56) References Cited

U.S. PATENT DOCUMENTS

| 4,867,777 A | 9/1989 | Doud |
| 5,139,560 A | 8/1992 | Renkl et al. |
| 5,597,396 A | 1/1997 | Tohjo |
| 5,938,806 A | 8/1999 | Mine et al. |

FOREIGN PATENT DOCUMENTS

| EP | 0 120 373 | 10/1984 |
| GB | 2 132 188 | 7/1984 |
| JP | 08 319123 | 12/1996 |
| JP | 10 087335 | 7/1998 |

*Primary Examiner* — Matthew Daniels
*Assistant Examiner* — Russell Kemmerle, III
(74) *Attorney, Agent, or Firm* — Oblon, Spivak, McClelland, Maier & Neustadt, L.L.P.

(57) ABSTRACT

The invention relates to:
a process for manufacturing a hollow glass product (30) employing at least one mold comprising two mold halves (100, 200) closed up at one end on a ring mold (300) and closed off at the other end by a top, which process includes the greasing of at least one of said molds in the closed-up position of said mold halves (100, 200) on said ring mold (300), but said top not closing up said other end, characterized in that the greasing includes a spraying by a spray tube (4) moving in the cavity of the mold and in that the spray tube (4) is carried by a robot (1) that can move alongside the blank mold of an IS machine
a device for implementing this process.

18 Claims, 3 Drawing Sheets

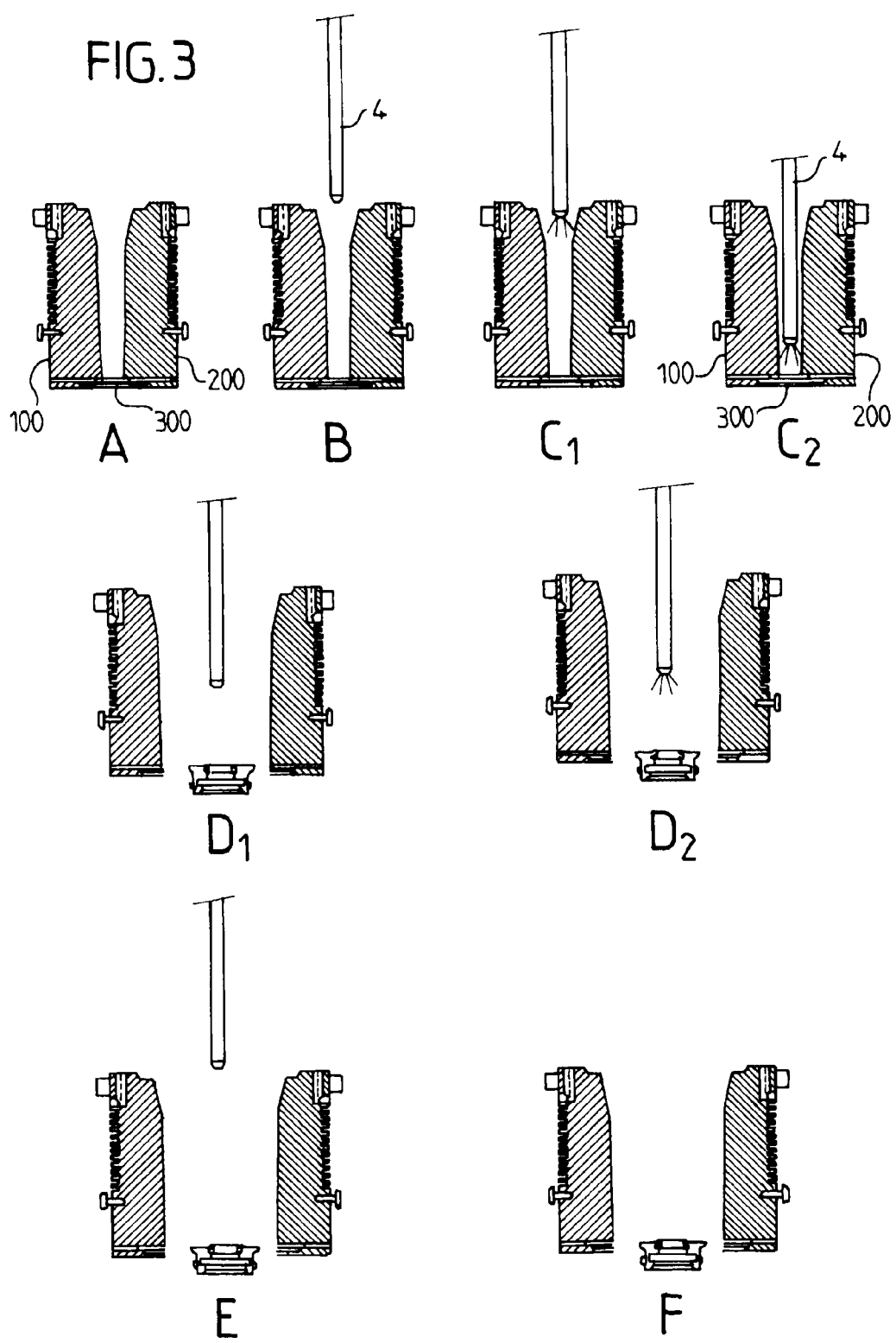

AUTOMATIC GREASING OF MOLDS FOR FORMING HOLLOW GLASS PRODUCTS

The present invention relates to the manufacture of hollow glass products, such as bottles, flasks or pots.

This manufacture employs IS (individual section) machines in which each section is intended to treat one or more parisons simultaneously, each parison being accommodated and treated in a dedicated blank mold and then a dedicated finishing mold.

The blank mold consists of two mold halves defining a vertical parting line at the start of the manufacturing cycle.

The two mold halves are closed up on a ring mold at the lower end of the blank mold.

The blank mold also includes a punch, the ascending movement of which pierces the blank.

The charging of the parison into the blank mold is carried out by gravity via its open upper end on which a funnel is mounted.

In the press-and-blow process, this charging is carried out in the lower position of the punch. The upper end of the blank mold is then closed off via the top and then the punch performs an upward movement starting from the ring mold, driving the parison with it. After the top (upper part) of the mold has been filled, the glass flows through the press channels to form the ring.

In the blow-and-blow process, the charging of the parison is carried out in the high position of the punch, which is however relatively short. The upper end of the blank mold is connected to a means of compressing the top of the parison, having the effect of forming the ring. This upper end is then closed off by the blank mold top, the punch is lowered, and the blank pierced by blowing.

The blank mold top and the two blank mold halves are opened and the blank supported by the ring mold is transferred into the finishing mold, by turning over about a horizontal axis.

The forming of the blank into a finished product is accomplished in three phases:
stretching of the blank under its own weight;
inflation of the stretched blank; and
extraction of the bottle.

A major source of the visible defects on the surface of the finished product arises from the relatively violent contact of the parison with the surface of the blank mold cavity during charging. To eliminate these defects, it is necessary to ensure the quality of the cavity surface, and also the sliding of the parison over the cavity surface, by periodically greasing it.

These greasing operations are normally carried out by an operator using a brush dipped beforehand into oil. The operator can do this on the run, without stopping the normal operation of the IS machine, but more stringent safety conditions may prescribe ejecting the parisons intended for the section in question during at least one operating cycle of the machine.

The greasing of blank molds by an operator poses several types of problem.

Firstly, the operator is exposed to a high temperature and to considerable noise, even using the standard recommended protection devices. Exposure to such conditions may in time be limited, for example by national regulations.

In addition, the operator must coordinate his movements with those of automated mechanical elements, and may rapidly experience tension or fatigue.

Moreover, the operator greases the molds periodically according to a more or less random choice, but does not limit the greasing to just the molds that actually require to be greased.

Furthermore, it turns out that the quantity of oil deposited with the brush is greater than the necessary quantity and that the deposited film is irregular. In addition, brush application is relatively complex and lengthy, for example requiring, after the brush has been dipped into the oil, the excess oil to be removed therefrom.

The inventors were given the objective of designing a novel process in which a minimum quantity of oil is deposited as a film of uniform thickness over the entire surface of the cavity of the molds, and without direct physical intervention by an operator.

For this purpose, one subject of the invention is a process for manufacturing a hollow glass product employing at least one mold comprising two mold halves closed up at one end on a ring mold and closed off at the other end by a top, which process includes the greasing of at least one of said molds in the closed-up position of said mold halves on said ring mold, but said top not closing up said other end, characterized in that the greasing includes a spraying by a spray tube moving in the cavity of the mold, and in that the spray tube is carried by a robot that can move alongside the blank mold of an IS machine.

The greasing of the mold in the closed position may be carried out in one operation, that is to say the separate greasing of the two mold halves is avoided. However, in this configuration, the inventors have shown the quality of greasing carried out by a spray tool moving in the cavity of the mold. In the case of hollow glass products of the bottle type having an axis of revolution, the spray tool may consist of a spray tube, the end of which sprays for example a 45° cone of oil. However, all forms of spray tube may be envisioned according to the shape of the molds.

The spray tube is connected to control means and to means for actuating it, which advantageously are a certain distance away and insulated so that the operator is no longer exposed either to heat or to noise for greasing the molds.

According to a first embodiment, the process of the invention comprises the following:
when the mold halves are in the closed-up position on the ring mold, the spray tube is inserted into the cavity of the mold via that end of the latter left open by the absence of said top;
the spray tube is moved toward the ring mold and simultaneously sprays a uniform film over the entire surface of the cavity;
the two mold halves are opened;
optionally, the spray tube is moved back away from the ring mold; and then
the ring mold is sprayed by the spray tube.

According to a second embodiment, the process comprises the following:
when the mold halves are in the nonclosed-up position on the ring mold, the spray tube is positioned at a suitable distance from the ring mold for spraying;
the ring mold is sprayed by the spray tube;
the mold halves are closed up on the ring mold;
optionally, the spray tube is moved closer to the ring mold; and then
the spray tube is moved away from the ring mold and simultaneously sprays a uniform film over the entire surface of the cavity.

In one particularly advantageous embodiment, the greasing of the molds is controlled by hot-end monitoring of the hollow glass products. The term "hot-end" is commonly understood to mean that phase of the process in which the products leave the finishing molds, just after their definitive forming. The purpose of hot-end monitoring is also to identify faults on the product formed, especially on its part corresponding to the first contact of the parison with the blank mold, during charging.

Which mold the defective product comes from is identified and the cavity of this mold is greased.

Hot-end monitoring preferably consists in measuring the infrared radiation emitted by the products leaving the molds, thereby mapping the surface of the products.

It is conceivable to grease the finishing molds using the process of the invention. However, it is the greasing of the blank molds, much more decisive as explained above relative to charging them with the parison, which is more particularly intended here.

According to the invention, it is preferable to grease the blank mold(s) section by section. It is possible, in particular, to grease only the blank mold(s) of one section of the IS machine, corresponding, for example, to one or more products deemed to be defective by the hot-end monitoring, and then to treat the other sections in the same way, one by one. It is also possible to carry out the same greasing operations in the absence of any hot-end monitoring of the hollow glass products, according to a pre-established sequence.

In one advantageous embodiment, the greasing of all the blank molds belonging to the same section of an IS machine is carried out simultaneously by means of a device comprising as many spray tubes as said section has blank molds. The device carrying the spray tubes navigates section by section.

Adapting the operating cycle of the section during greasing of the IS machine may prove to be judicious. Thus, according to other features of the process of the invention, when the blank mold(s) of a section is greased during operation of the IS machine:
- the parison(s) intended for this(these) blank mold(s) is(are) ejected, the cavity of this or these mold(s) remaining free for the insertion and operation of the spray tube;
- the corresponding one or more ring mold(s) remains(remain) beside the blank mold(s) (since no glass forming takes place during this modified greasing cycle, no transfer into the finishing mold is necessary and the ring mold is correctly positioned for starting the next production cycle); and
- the cooling of this or these blank mold(s) is stopped.

As regards the latter adaptation of the operating cycle of the section during greasing, it is specified that the temperature of the blank molds and of the ring molds is very important in the manufacture of hollow glass products. This is because it is necessary for this temperature not to be too high, since the punch being retracted then causes glass threads proscribed for consumption. This is why the molds are equipped with a coolant circuit.

However, too cool a blank mold is a source of defects in the hollow glass product. Thus, when the greasing requires the ejection of one or more parisons per blank mold, the latter may be too cool for the first few produced following this, so that these have to be scrapped. This is why it is useful to stop cooling the blank mold or molds.

In addition, since the greasing takes place according to the invention in a closed mold, the mold cools down less.

Another subject of the invention consists of a device for implementing the process described above, comprising:
- one or more spray tubes for simultaneously spraying a greasing fluid into the cavity of as many blank molds belonging to the same section of an IS machine, each of these blank molds having at its lower end, its two constituent mold halves in the closed-up position on the corresponding ring mold, its upper end not being closed off by the corresponding blank mold top;
- means for controlling and actuating the one or more spray tubes; and
- means for adapting the operating cycle for said section of an IS machine;
- the one or more spray tubes being carried by a robot that can move alongside the blank molds of said IS machine.

The means for adapting the operating cycle of the section relates in particular to the following modifications:
- the ring molds remain beside the blank molds;
- the finishing molds are immobilized in the start position of the production cycle.

According to preferred features of the device of the invention:
- the robot is mounted so as to move translationally on a rail alongside the blank molds of said IS machine; and
- the robot has six axes of movement.

The means for adapting the operating cycle of the section advantageously also includes means for ejecting the parison (s) intended for the blank mold(s) during greasing.

Preferably, said means for controlling and actuating the one or more spray tubes are connected to means for detecting faults in the product after it has been formed. These fault detection means opportunely provide hot-end monitoring of the products, such as measuring the infrared radiation emitted by the products leaving the molds, as already mentioned above. This measurement makes it possible for defects on the product, and possibly the reproducibility of certain defects, to be precisely located and consequently defects in the cavity of a blank mold for example to be located. Hot-end defect detection, that is to say at the start of obtaining the product, makes it possible to intervene on the defective molds by greasing them as rapidly as possible.

However, it is not excluded, according to the invention, to connect the means for controlling and actuating the one or more spray tubes to other means for detecting faults in the product, such as cold-end monitoring, that is to say automated monitoring on exiting the annealing lehr, relating to deviation from the desired dimensions (size, etc.) or to the presence of a maximum number of defects (crizzles, etc.).

Preferably, the device includes a security stop in the presence of a body inside a defined area. Specifically, the support for the spray tubes is best fitted to the IS machine by being mounted beside the blank molds. Obviously it is necessary to avoid any collision between the support for the spray tubes and an operator or any mechanical component. In addition, the device may be provided with a highly sensitive collision-monitoring movement which, in the case of an impact, triggers an alarm and rapidly stops the robot, applying a deceleration so as to reduce the effect of the impact.

The invention is illustrated with the aid of the following example, with reference to the appended drawings in which:

FIG. 3 shows the method according to the invention for the top-down greasing of a blank mold.

EXAMPLE

Figure 1:
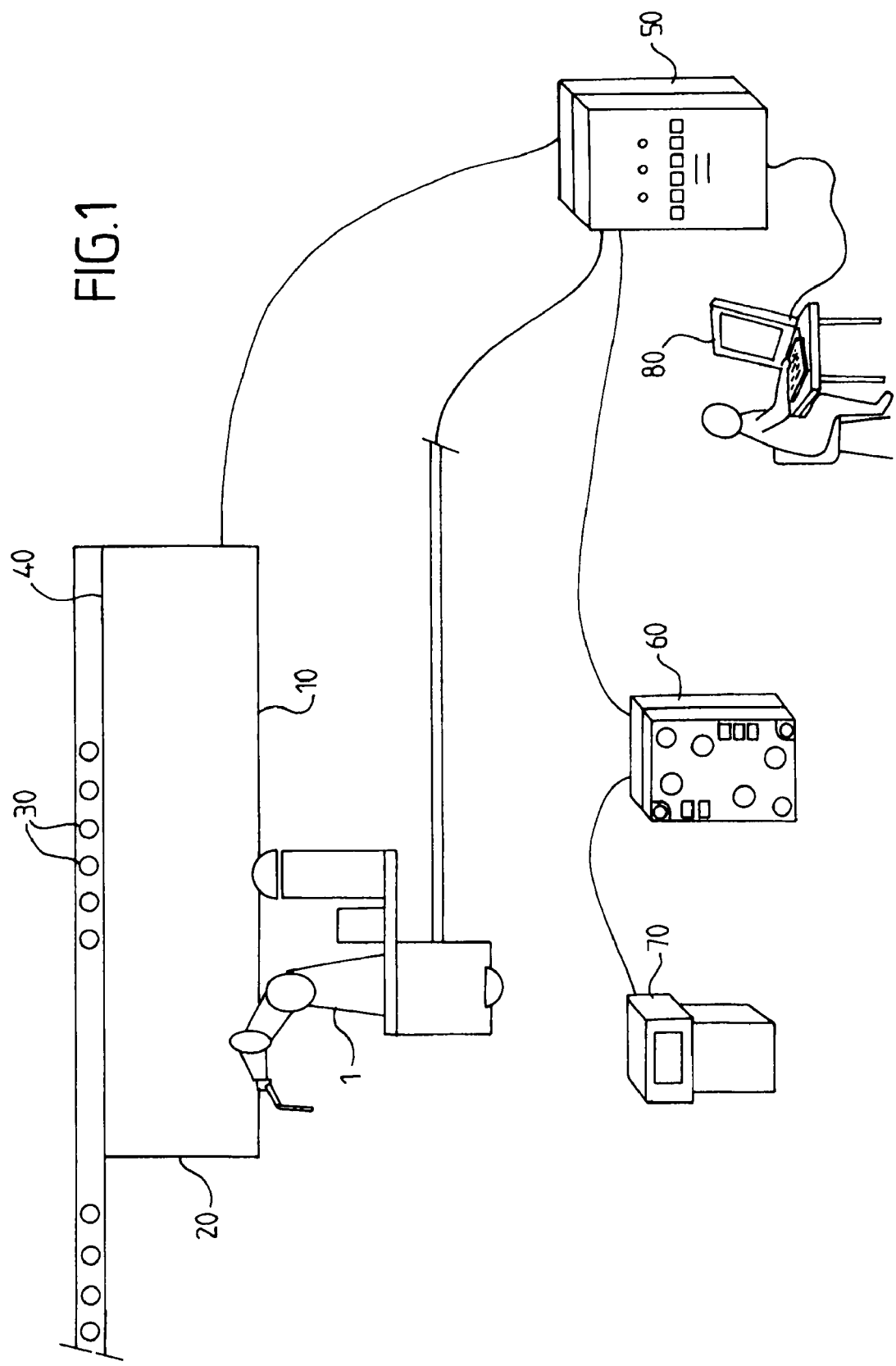
FIG. 1 is an overall schematic representation of the greasing device according to the invention, connected to interfaces useful for operating it.

Referring to FIG. 1, a six-axis robot 1 carries an optionally multiple greasing tool, described in greater detail below with reference to FIG. 2. The robot 1 is placed beside the blank molds 10 of an IS machine 20. Bottles 30 are produced on the finishing mold side 40 of the IS machine 20.

A control unit 50 connects the robot 1 to the IS machine 20, making it possible to control the activity sequences of the robot 1 (including a 5-bar air feed for the spraying) and to adapt one or more operating cycles of the section on which the robot 1 is being used. However, the control unit 50 receives information from the IS machine 20, such as an indication of defects on the bottles 30 that are liable to trigger intervention by the robot 1 on the section in question.

The control unit 50 also receives information from the robot 1 itself, such as the closeness of a foreign body causing the movements of the robot to be adapted or the robot to be stopped, and also the adaptation of the operation of the IS machine.

The control unit 50 is connected to an electrical cabinet 60 which is itself connected to a computer 70, both being dedicated to the movements of the robot.

Finally, the control unit 50 is connected to a terminal 80 via which an operator can examine, but also intervene on, the operation of the whole assembly.

Figure 2:
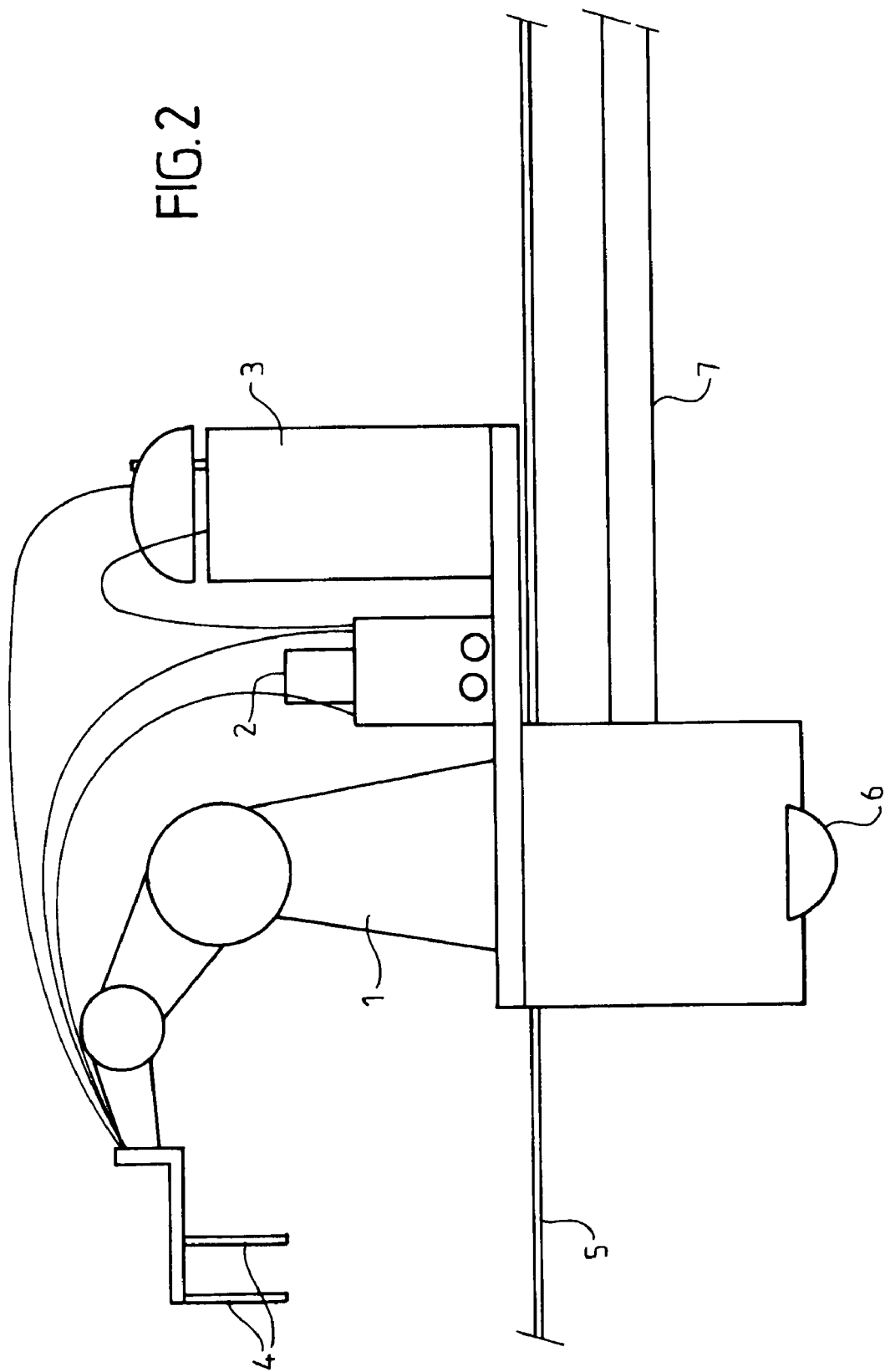
FIG. 2 is a more detailed schematic representation of the means for spraying oil by this greasing device.

Referring to FIG. 2, the six-axis robot 1 is mounted so as to move translationally on a rail 5 alongside the blank molds of an IS machine (not shown). The various cables connected to the robot 1 (for power supply and control of the robot movements, compressed-air supply, etc.) are joined onto a cable-carrying chain 7 that compensates for the translational movement of the robot 1.

The robot 1 is equipped with a foreign-body detector 6 connected to an automatic stop. Moreover, the robot function has an automatic deceleration function that reduces the effect of a possible contact, for example in the event of malfunction of the detector 6.

The robot 1 includes a motor 2 which moves it translationally.

It carries a set of two spray tubes 4 suitable for double-parison IS machine sections. The two spray tubes 4 are connected to an oil reservoir 3 and to a 5-bar air supply.

The activity of each of the spray tubes 4 will now be described in relation to FIG. 3.

FIG. 3A shows a blank mold in the closed-up position of the mold halves 100, 200 on the ring mold 300, but in the position in which the upper end is open (absence of the blank mold top).

In FIG. 3B, a spray tube 4 approaches the mold cavity from above.

In FIG. 3 $C_1$ and $C_2$, the spray tube 4 travels the entire length of the cavity, with continuous emission of a 45° oil spray cone via its end. The parts of the cavity belonging to the mold halves 100, 200 are therefore greased.

In FIGS. 3 $D_1$ and $D_2$, the mold halves 100, 200 have been moved apart, leaving the ring mold 300 visible, the spray tube 4 being retracted in such a way that its spray correctly greases the ring mold.

In FIGS. 3 E and F, the spray tube 4 is moved on.

A normal cycle for the production of a hollow glass article may start after the mold halves have been closed up on the ring mold and the funnel put into position for charging with a new parison.

Various modes of greasing blank molds have been tried on a double-parison section IS machine for the production of Bordeaux wine bottles.

Mode 1: Operator—ejection of the parisons on two operating cycles of the IS machine for greasing the blank molds and two other cycles for greasing the ring molds.

Mode 2: Operator—no ejection of the parisons during greasing.

Mode 3: Robot, as described above—with spray tubes replaced by a brush impregnated with a suitable quantity of oil, ejection of the parisons on two cycles for greasing the blank molds and the ring molds in one operation.

Mode 4: According to the invention—spray tubes, ejection of parisons on one cycle for greasing the blank molds and the ring molds.

Given in the table below are the number of products lost according to the greasing mode. The bottles rejected are defective bottles obtained after greasing the blank molds and/or the ring molds. These defects essentially derive from the fact that the blank molds and/or the ring molds are then at too low a temperature.

| Greasing mode | Parisons ejected | Bottles rejected | Total |
| --- | --- | --- | --- |
| 1 | 4 (2 cycles for greasing the blank molds) | 4 (2 blank mold cycles) | 16 |
|   | 4 (2 cycles for greasing the ring molds) | 4 (2 ring mold cycles) |   |
| 2 | 0 | 4 (2 blank mold cycles) | 8 |
|   |   | 4 (2 ring mold cycles) |   |
| 3 | 4 (2 cycles) | 4 (2 cycles) | 8 |
| 4 | 2 (1 cycle) | 4 (2 cycles) | 6 |

In modes 1 and 2, there is a distinction between ejected parisons and/or rejected bottles following greasing of the blank molds on the one hand and of the ring molds on the other, since the two greasing operations are carried out separately.

Modes 1 and 2 are those in which an operator must be subjected to heat and noise.

Mode 3, a suitable quantity of oil impregnates the brush, by it being dipped into an oil bath and then extracted therefrom and by rotating about an axis and two alternately opposed rotation directions in order to remove the excess oil.

It is the greasing mode according to the invention that results in the fewest bottles produced being lost.

In addition, the quantity of oil consumed by the spray tubes is about three times less than that consumed using an operator.

Moreover, the quantity of Bordeaux wine bottles obtained with greasing by an operator on the one hand, and by greasing according to the invention on the other, was evaluated over identical production periods of ten days on the same IS machine. This involved cold-end evaluation, that is to say upon exiting the annealing lehr, according to the following four criteria:

visible defects (oil stains on the bottle, stones in the glass, bubbles, etc.);

thickness of the glass (which must not be too low for risk of breaking);

bore—passage of the stopper;

crizzles—cuts in the thickness of the glass, which may form during manufacture and may weaken the bottle.

|  | Greasing according to the invention | Greasing by an operator |
| --- | --- | --- |
| Visible defects | 3.70 | 3.82 |
| Glass thickness | 0.05 | 0.15 |
| Bore | 0.11 | 0.15 |
| Crizzles | 0.23 | 0.37 |

The results are percentages of defective bottles. They show a slight improvement in the quality of the products at the cold end, obtained by automated greasing according to the invention.

The invention claimed is:

1. A process for manufacturing a hollow glass product employing at least one mold having two mold halves capable of being closed up at one end on a ring mold and closed off at the other end by a top, the process comprising:
   greasing the at least one mold in a closed-up position of the mold halves on the ring mold, but the top not closing up the other end, the greasing including spraying via an axial end of a spray tube moving in a cavity of the mold, the spray tube being carried by a robot that can move alongside one or more blank molds of an IS machine; and
   spraying the ring mold via the axial end of the spray tube when the mold halves of the at least one mold are in a nonclosed-up position.

2. The process as claimed in claim 1, further including:
   when the mold halves are in the closed-up position on the ring mold, inserting the spray tube into the cavity of the mold via the other end of the mold halves left open by the absence of the top;
   moving the spray tube toward the ring mold and simultaneously spraying a uniform film over the entire surface of the cavity, the cavity defined by the mold halves and the ring mold which closes the end of the cavity;
   opening the two mold halves; and then
   spraying the ring mold by the spray tube.

3. The process as claimed in claim 2, further comprising:
   moving the spray tube back away from the ring mold; and then
   spraying the ring mold by the spray tube.

4. The process as claimed in claim 1, further including:
   when the mold halves are in the nonclosed-up position on the ring mold, positioning the spray tube at a suitable distance from the ring mold for spraying;
   spraying the ring mold by the spray tube;
   closing up the mold halves on the ring mold; and then
   moving the spray tube away from the ring mold and simultaneously spraying a uniform film over the entire surface of the cavity.

5. The process as claimed in claim 4, further comprising:
   moving the spray tube closer to the ring mold; and then
   moving the spray tube away from the ring mold and simultaneously spraying a uniform film over the entire surface of the cavity.

6. The process as claimed in claim 1, wherein the greasing of the molds is controlled by hot-end monitoring of the hollow glass products.

7. The process as claimed in claim 6, wherein the hot-end monitoring consists of measuring infrared radiation emitted by the products leaving the molds.

8. The process as claimed in claim 1, wherein the greasing of the one or more blank molds is carried out section by section.

9. The process as claimed in claim 8, wherein, when the one or more blank molds of a section are greased during operation of the IS machine, one or more parisons intended for the one or more blank molds are ejected.

10. The process as claimed in claim 8, wherein, when the one or more blank molds of a section are greased during operation of the IS machine, corresponding one or more ring molds remain beside the one or more blank molds.

11. The process as claimed in claim 8, wherein, when the one or more blank molds of a section are greased during operation of the IS machine, the cooling of the one or more blank molds is stopped.

12. The process as claimed in claim 1, wherein the greasing of all blank molds belonging to the same section of the IS machine is carried out simultaneously by a greasing device comprising as many spray tubes as the section has blank molds.

13. A device for manufacturing a hollow glass product, comprising:
   one or more spray tubes that simultaneously spray a greasing fluid into the cavity of as many blank molds belonging to the same section of an IS machine, the greasing fluid being sprayed from respective axial ends of the one or more spray tubes, each of the blank molds having, at a lower end, two constituent mold halves in a closed-up position on a corresponding ring mold, and an upper end not being closed off by a corresponding blank mold top; and
   a control unit to control and actuate the one or more spray tubes and to adapt the operating cycle for the section of the IS machine,
   the control unit being configured to actuate the one or more spray tubes to simultaneously spray the corresponding ring mold of each of the blank molds when the mold halves of each of the blank molds are in a nonclosed-up position, and
   the one or more spray tubes being carried by a robot that can move alongside the blank molds of the IS machine.

14. The device as claimed in claim 13, wherein the robot is mounted so as to move translationally on a rail alongside the blank molds of the IS machine.

15. The device as claimed in claim 13, wherein the robot has six axes of movement.

16. The device as claimed in claim 13, wherein the control unit is further configured to eject parisons intended for the blank molds during greasing.

17. The device as claimed in claim 13, wherein the control unit that controls and actuates the one or more spray tubes is connected to a fault detector that detects faults in the product after the product has been formed.

18. The device as claimed in claim 13, further including a security stop that stops the robot when the presence of a foreign body is detected inside a defined area.

* * * * *